(12) United States Patent
Shinano et al.

(10) Patent No.: US 9,784,940 B2
(45) Date of Patent: Oct. 10, 2017

(54) LENS BARREL

(71) Applicant: Panasonic Intellectual Property Management Co., Ltd., Osaka (JP)

(72) Inventors: Fumio Shinano, Osaka (JP); Junichi Takahashi, Osaka (JP); Hiroshi Kurumatani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 14/862,204

(22) Filed: Sep. 23, 2015

(65) Prior Publication Data

US 2016/0091689 A1 Mar. 31, 2016

(30) Foreign Application Priority Data

Sep. 26, 2014 (JP) ................................. 2014-197549
Sep. 10, 2015 (JP) ................................. 2015-178058

(51) Int. Cl.
*G02B 7/02* (2006.01)

(52) U.S. Cl.
CPC .................................. *G02B 7/023* (2013.01)

(58) Field of Classification Search
CPC ...................................................... G02B 7/023
See application file for complete search history.

(56) References Cited

U.S. PATENT DOCUMENTS 5,243,467 A * 9/1993 Tanaka .................. G02B 7/102
359/694
2005/0057822 A1 3/2005 Hayashi

FOREIGN PATENT DOCUMENTS

JP 4574970 11/2010
JP 2012-8335 1/2012

* cited by examiner

*Primary Examiner* — Joseph P Martinez
(74) *Attorney, Agent, or Firm* — Wenderoth, Lind & Ponack, L.L.P.

(57) ABSTRACT

There is provided a lens barrel capable of suppressing deformation of a rear frame upon application of a radial inward force to the rear frame. The lens barrel is a lens barrel attachable to a camera body. The lens barrel includes a lens mount mechanically or electrically connected to the camera body, a fixed frame fixed to the lens mount, and a rear frame that covers an outer periphery of the fixed frame. The rear frame has a tubular portion and flanges that extend from a front end and a rear end of the tubular portion radially inward, and at least a part of a radial inner end of the flange is brought into contact with the fixed frame.

3 Claims, 18 Drawing Sheets

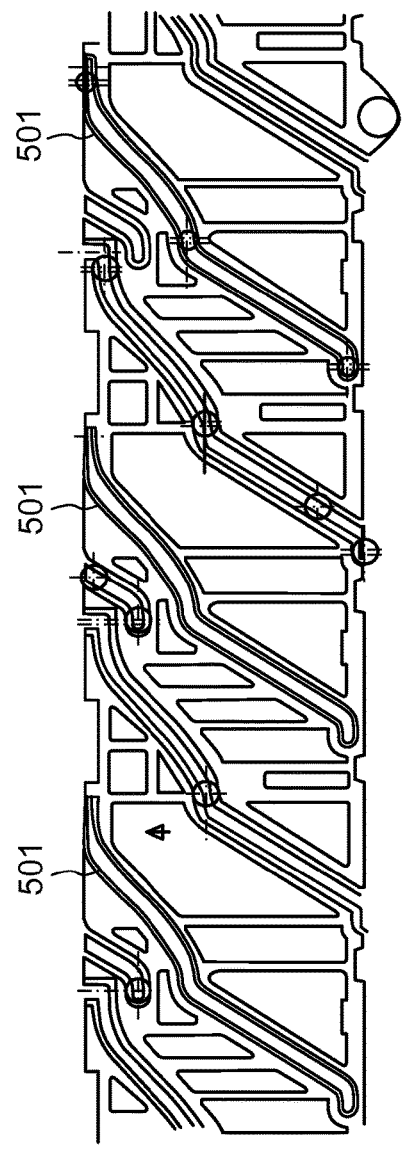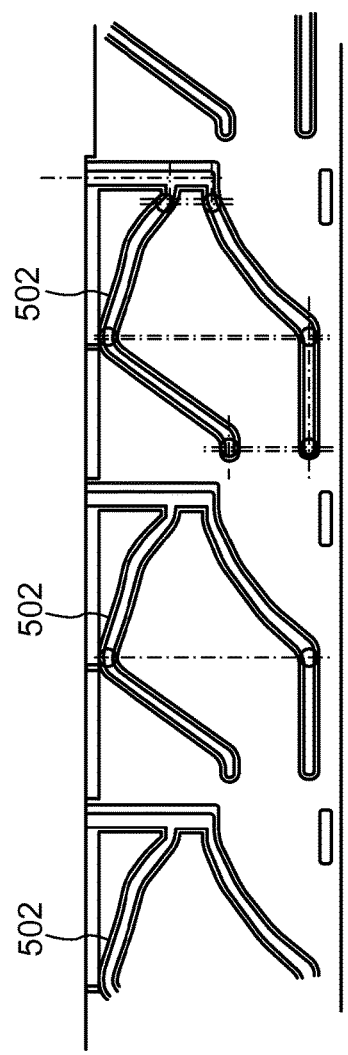
FIG. 4A
FIG. 4B

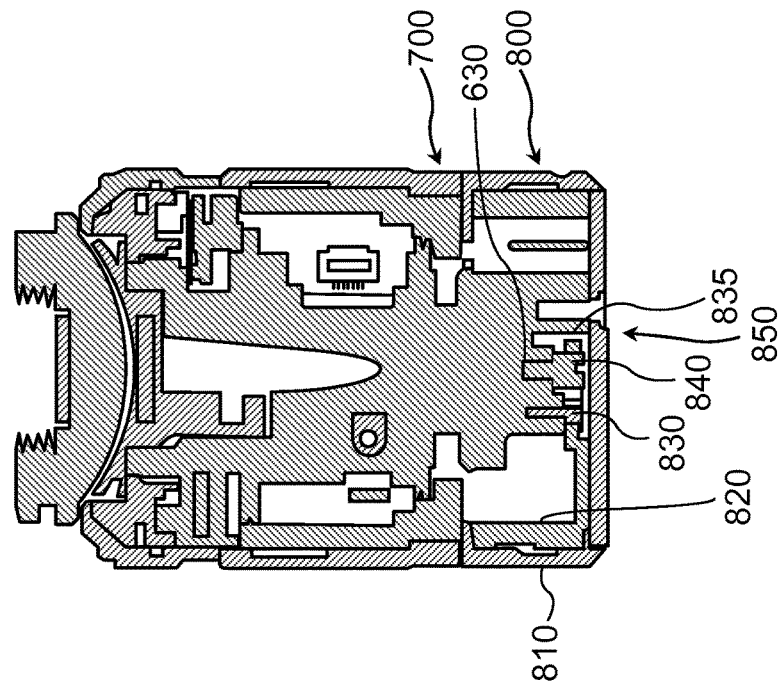
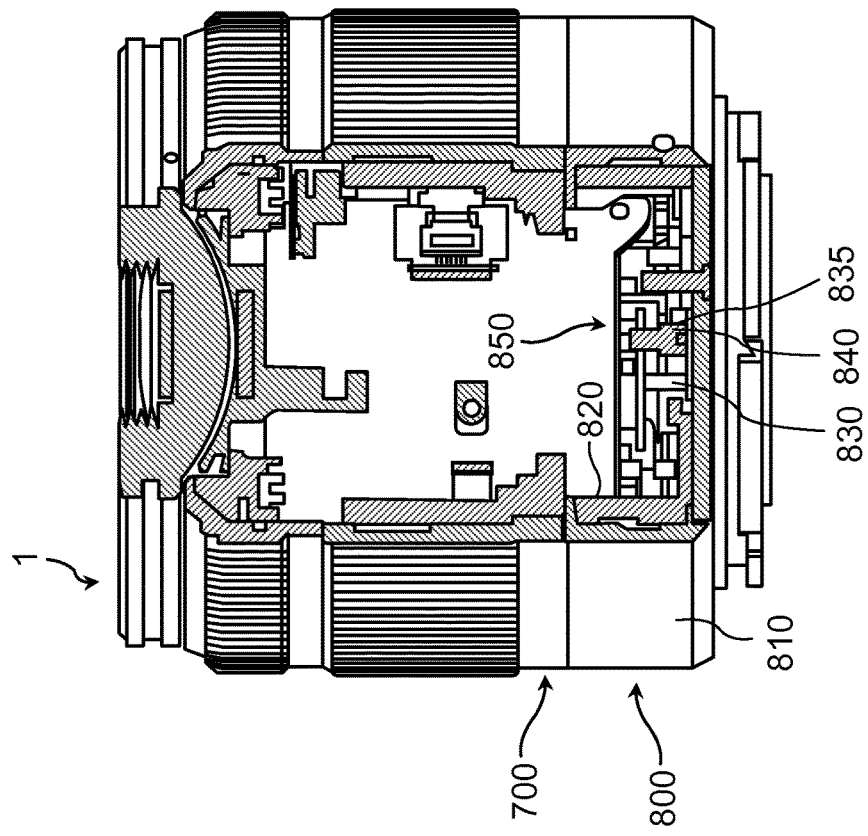

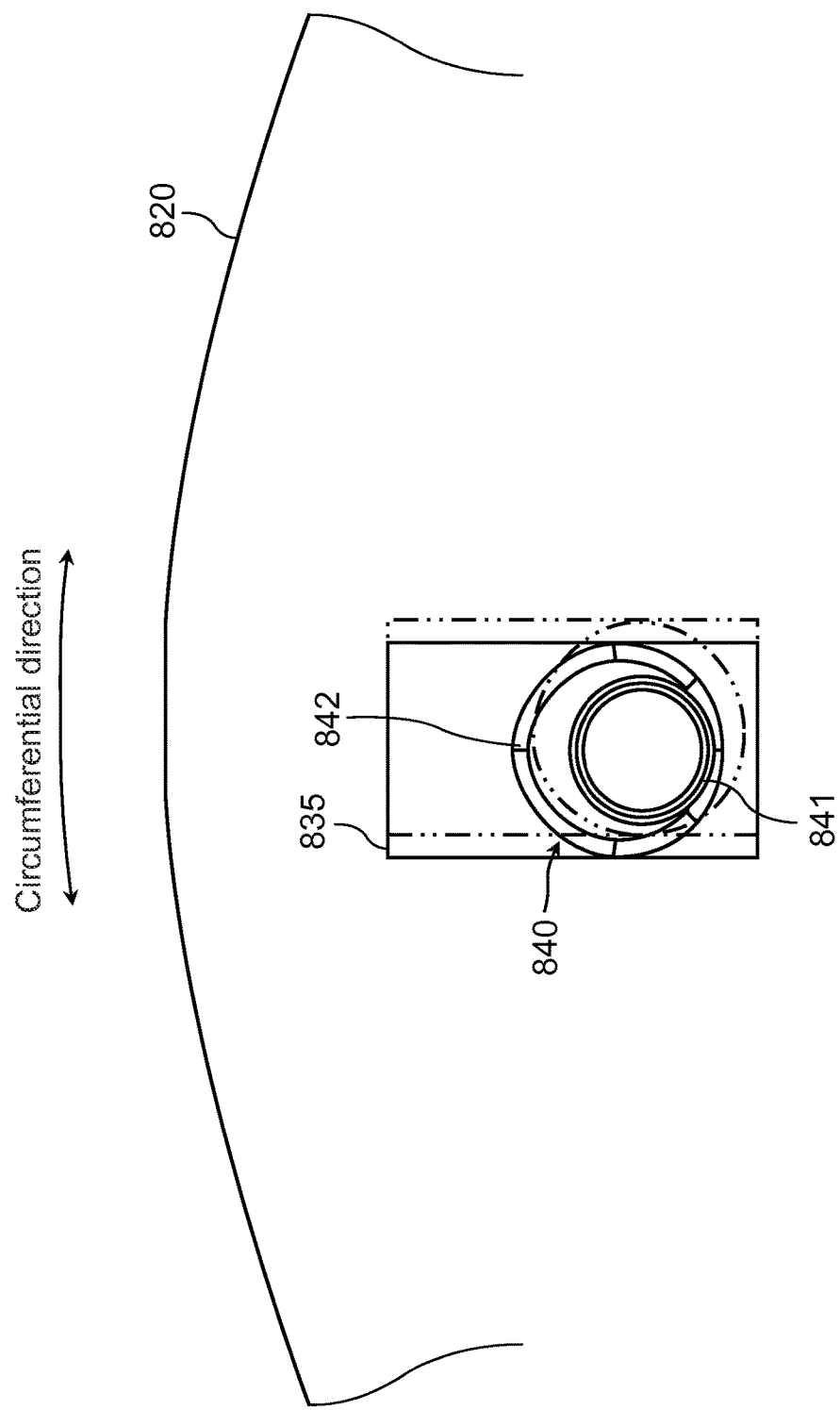

LENS BARREL

BACKGROUND OF THE INVENTION

1. Field of the Invention

The present disclosure relates to a lens barrel that accommodates a lens and is attached to a camera body.

2. Description of the Related Art

U.S. Pat. No. 4,574,970 discloses a lens barrel that accommodates a lens and is attached to a camera body, the lens barrel having a rear frame (rear cover) that covers a rear portion of a zoom ring from its outer peripheral side.

In operating the zoom ring or replacing the lens barrel to be attached to the camera body, the camera user grasps the outer periphery of the lens barrel, and applies a radial inward force to the lens barrel. The radial inward force applied on the rear frame may deform the rear frame.

SUMMARY OF THE INVENTION

The present disclosure provides a lens barrel capable of suppressing deformation of the rear frame upon application of the radial inward force to the rear frame.

A lens barrel of the present disclosure is a lens barrel attachable to a camera body. The lens barrel includes a mount mechanically or electrically connected to the camera body, a fixed frame fixed to the mount, and a rear frame that covers an outer periphery of the fixed frame. The rear frame has a tubular portion and a flange that extends radially inward from at least one of a front end and a rear end of the tubular portion, and at least a part of the radial inner end of the flange is brought into contact with the fixed frame.

In the lens barrel of the present disclosure, the rear frame has the flange that extends radially inward from at least one of the front end and the rear end of the tubular portion. For this reason, the radial strength of the rear frame increases. Further, at least a part of the radial inner end of the flange is brought into contact with the fixed frame. Thus, even when a radially inward force is applied to the rear frame, deformation of the rear frame is suppressed.

BRIEF DESCRIPTION OF DRAWINGS

FIG. 4A is an exploded view illustrating a cam frame of the lens barrel in accordance with the first exemplary embodiment;

FIG. 4B is an exploded view illustrating the cam frame of the lens barrel in accordance with the first exemplary embodiment;

FIG. 12A is a sectional view illustrating an adjustment portion of the lens barrel in accordance with the first exemplary embodiment;

FIG. 12B is a sectional view illustrating the adjustment portion of the lens barrel in accordance with the first exemplary embodiment;

FIG. 14 is a schematic enlarged view illustrating the place where the adjustment pin engages with fixed frame unit and rear frame of the lens barrel in accordance with the first exemplary embodiment;

DETAILED DESCRIPTION OF THE PREFERRED EMBODIMENT

An exemplary embodiment will be described below in detail with reference to figures as appropriate. However, more detailed description than necessary may be omitted. For example, detailed description of well-known matters and overlapping description of substantially identical configurations may be omitted. This serves to avoid redundant description and to facilitate understanding of the present disclosure for those skilled in the art.

The inventor of the present invention provides appended figures and following description to gain a proper understanding of the present disclosure to those skilled in the art, and does not intend to limit the subject matter recited in claims.

First Exemplary Embodiment

A first exemplary embodiment will be described below with reference to drawings.
[1. Configuration]
[1-1. Summary]

Figure 1:
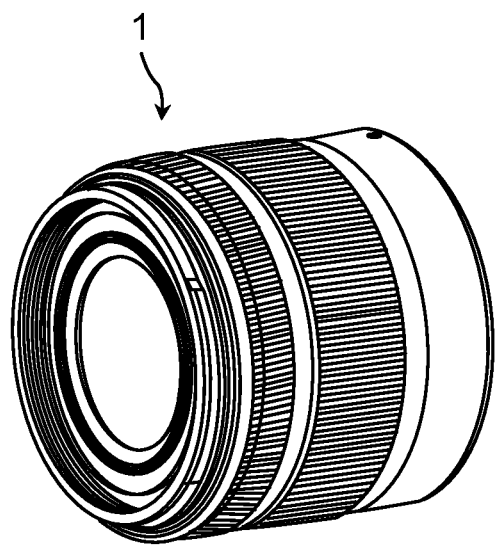
FIG. 1 is a perspective view illustrating a lens barrel in accordance with a first exemplary embodiment.

FIG. 1 is a perspective view of a lens barrel in accordance with the first exemplary embodiment.

Lens barrel 1 includes a plurality of lens group that forms an optical system, and a plurality of frames that accommodate the lens group. Lens barrel 1 is an interchangeable lens barrel detachably attached to a single-lens camera body.

In following description, along an optical axis, the side near a subject may be referred to as front side, and the side near an imaging device may be referred to as rear side.

Figure 2:
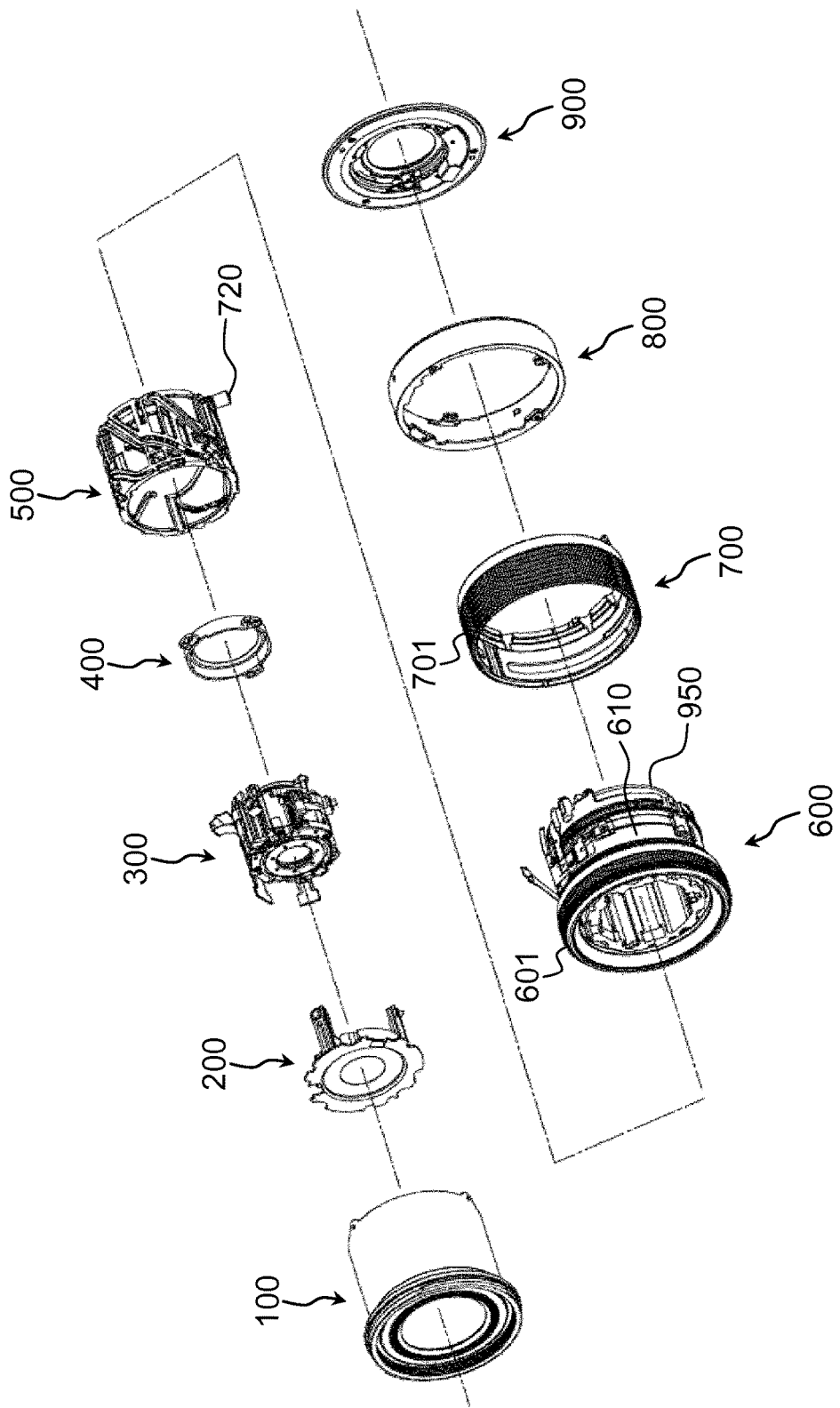
FIG. 2 is an exploded perspective view illustrating the lens barrel in accordance with the first exemplary embodiment.

FIG. 2 is an exploded perspective view of lens barrel 1 in accordance with the first exemplary embodiment.

Lens barrel 1 includes first group unit 100, second group unit 200, third to fifth group unit 300, sixth group unit 400, cam frame 500, fixed frame unit 600, zoom frame 700, rear frame 800, and lens mount 900.

First group unit 100 holds a first lens group. First group unit 100 is tubular. First group unit 100 is held on the outer periphery of cam frame 500 so as to be unrotatable relative to fixed frame unit 600 and movable along an optical axis.

Second group unit 200 holds a second lens group. Second group unit 200 is accommodated in first group unit 100. Second group unit 200 is held on the inner periphery of cam frame 500 so as to be unrotatable relative to fixed frame unit 600 and movable along the optical axis.

Third to fifth group unit 300 holds a third lens group, a fourth lens group, and a fifth lens group. Third to fifth group unit 300 is accommodated in first group unit 100. Third to fifth group unit 300 is held so as to be unrotatable relative to fixed frame 610 of fixed frame unit 600 and movable along the optical axis.

Sixth group unit 400 holds sixth lens group. Sixth group unit 400 is fixed to fixed frame 610 of fixed frame unit 600.

Cam frame 500 has cam grooves in its inner peripheral face and outer peripheral face. The cam frame 500 is accommodated in fixed frame unit 600. Cam frame 500 is held so as to be rotatable relative to fixed frame 610 and unmovable along the optical axis. FIG. 2 illustrates the state where coupling pin 720 for coupling cam frame 500 to zoom frame 700 unrotatably and unmovably relative to each other is coupled to cam frame 500.

Fixed frame unit 600 has fixed frame 610 and focus ring 601. Fixed frame 610 is fixed to lens mount 900. Accordingly, fixed frame 610 does not rotate about the optical axis and move along the optical axis. Focus ring 601 is held at a front end of fixed frame 610 so as to be rotatable relative to fixed frame 610. Circuit board 950 is attached to a rear end of fixed frame 610.

Zoom frame 700 is attached to fixed frame 610 in the rear of focus ring 601 of fixed frame 610 in the optical axis direction and on the outer periphery of fixed frame 610 so as to be rotatable relative to fixed frame 610. Zoom ring 701 for allowing the user to rotate zoom frame 700 is integrally formed on the outer periphery of zoom frame 700.

Rear frame 800 is disposed in the rear of zoom frame 700 in the optical axis direction and on the outer periphery of fixed frame 610. Rear frame 800 covers the outer periphery of fixed frame 610 between zoom frame 700 and lens mount 900.

Lens mount 900 has a contact at which a signal is input and output between lens barrel 1 and camera body.

With lens barrel 1 thus configured, when zoom frame 700 rotates about the optical axis, cam frame 500 coupled to zoom frame 700 via coupling pin 720 rotates with the rotation of zoom frame 700. With the rotation of cam frame 500, first group unit 100 and second group unit 200 move along the optical axis. At this time, first group unit 100 and second group unit 200 do not rotate relative to fixed frame unit 600. When zoom frame 700 rotates, third to fifth group unit 300 moves along the optical axis.

Figure 3A:
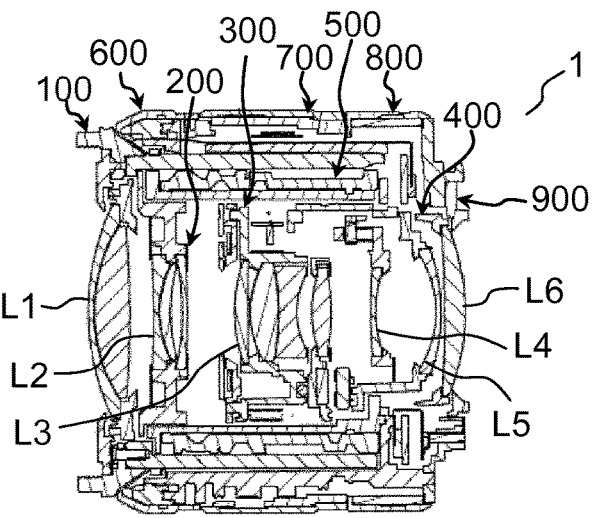
FIG. 3A is a sectional view illustrating of the lens barrel in accordance with the first exemplary embodiment.
Figure 3B:
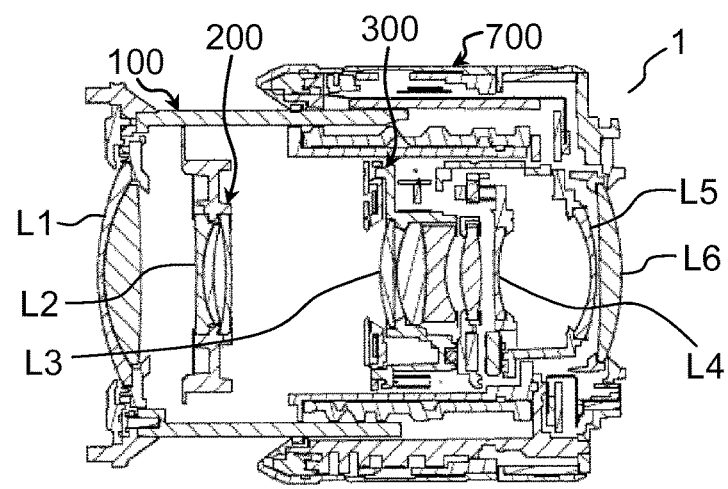
FIG. 3B is a sectional view illustrating the lens barrel in accordance with the first exemplary embodiment.
Figure 3C:
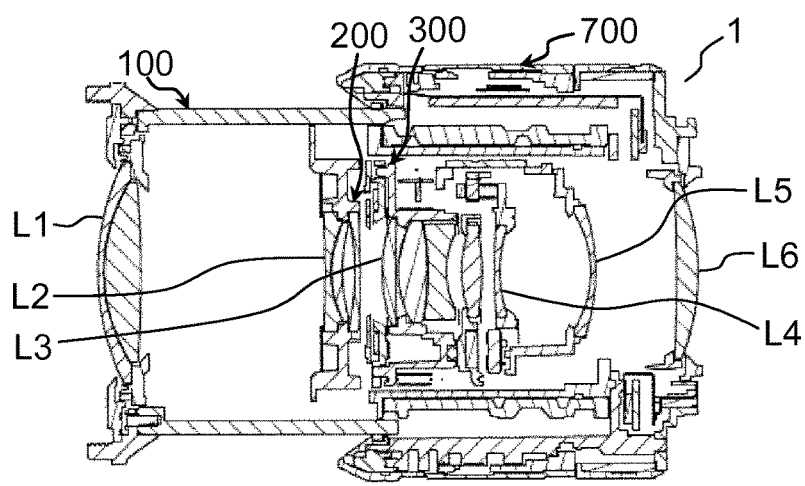
FIG. 3C is a sectional view illustrating the lens barrel in accordance with the first exemplary embodiment.

FIG. 3A to FIG. 3C are sectional views of lens barrel 1 in accordance with the first exemplary embodiment. FIG. 3A illustrates a cross section of lens barrel 1 in a collapsed state. FIG. 3B illustrates a cross section of lens barrel 1 in a wide state (wide angle). FIG. 3C illustrates a cross section of lens barrel 1 in a telephoto state (telephotographic).

As illustrated in FIG. 3A, FIG. 3B, and FIG. 3C, first group unit 100 holds first lens group L1, second group unit 200 holds second lens group L2, third to fifth group unit 300 holds third lens group L3, fourth lens group L4, and fifth lens group L5. Sixth group unit 400 holds sixth lens group L6.

When zoom frame 700 rotates, cam frame 500 rotates accordingly. Then, as illustrated in FIG. 3A, FIG. 3B, and FIG. 3C, with the rotation of cam frame 500, first group unit 100, second group unit 200, third to fifth group unit 300 move along the optical axis. Thereby, first lens group L1 held at first group unit 100, second lens group L2 held at second group unit 200, and third lens group L3, fourth lens group L4, and fifth lens group L5 that are held at third to fifth group unit 300 move along the optical axis. This achieves a focal distance corresponding to positional relationship of first lens group L1, second lens group L2, third lens group L3, fourth lens group L4, fifth lens group L5, and sixth lens group L6.

FIG. 4A and FIG. 4B are exploded views illustrating cam frame 500 of lens barrel 1 in accordance with the first exemplary embodiment. Specifically, FIG. 4A is an exploded view illustrating the outer peripheral face of cam frame 500. FIG. 4B is an exploded view illustrating the inner peripheral face of cam frame 500.

Cam groove 501 is formed in the outer peripheral face of cam frame 500. Cam groove 502 is formed in the inner peripheral face of cam frame 500. Cam groove 501 engages with a cam follower formed at a rear end of first group unit 100. Cam groove 502 engages with a cam follower formed at a rear end of second group unit 200. Thereby, with the rotation of cam frame 500, first group unit 100 and second group unit 200 move along the optical axis.

Figure 5A:
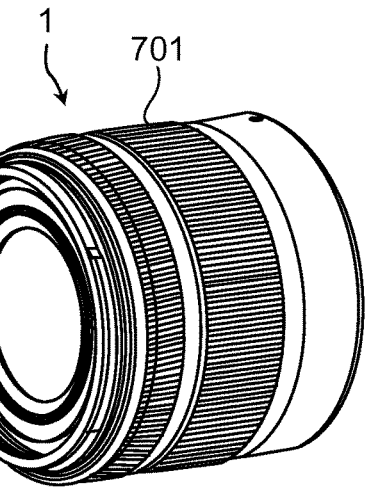
FIG. 5A is a perspective view illustrating the lens barrel in accordance with the first exemplary embodiment.
Figure 5B:
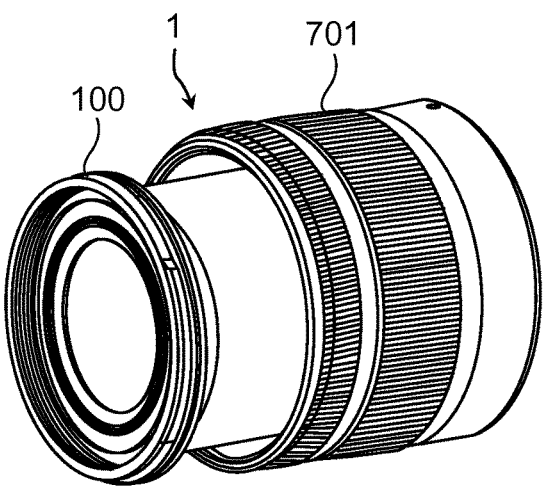
FIG. 5B is a perspective view illustrating the lens barrel in accordance with the first exemplary embodiment.
Figure 5C:
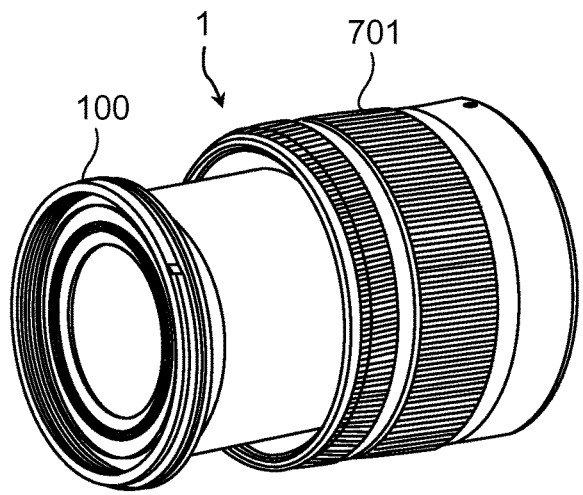
FIG. 5C is a perspective view illustrating the lens barrel in accordance with the first exemplary embodiment.

FIG. 5 are perspective views illustrating lens barrel 1 in accordance with the first exemplary embodiment. Specifically, FIG. 5A is a perspective view illustrating lens barrel 1 in a collapsed state. FIG. 5B is a perspective view illustrating lens barrel 1 in a wide state (wide angle). FIG. 5C is a perspective view illustrating lens barrel 1 in a telephoto state (telephotographic).

As illustrated in FIG. 5A, in the collapsed state, first group unit 100 moves to the rearmost side along the optical axis, resulting in that lens barrel 1 becomes shortest along the optical axis. On the contrary, when zoom ring 701 is rotated to be in the wide state as illustrated in FIG. 5B, first group unit 100 moves closer to the subject than in the collapsed state, resulting in that the lens barrel 1 becomes longer along the optical axis. When zoom ring 701 is rotated to be in the telephoto state as illustrated in FIG. 5C, first group unit 100 moves closest to the subject, resulting in that lens barrel 1 becomes longest along the optical axis.

[1-2. Rear Frame]

[1-2-1. Configuration of Rear Frame]

Figure 6A:
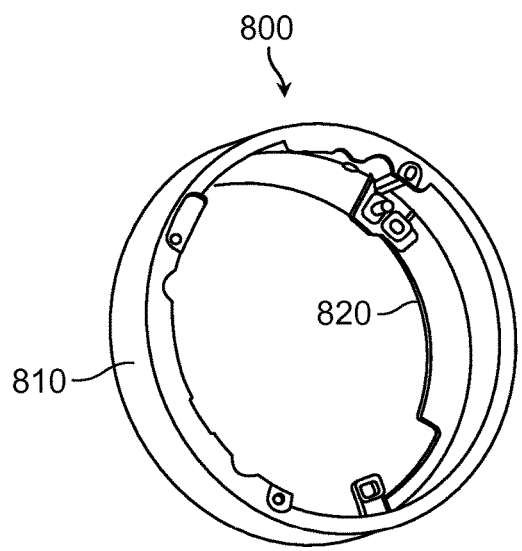
FIG. 6A is a perspective view illustrating a rear frame of the lens barrel in accordance with the first exemplary embodiment.
Figure 6B:
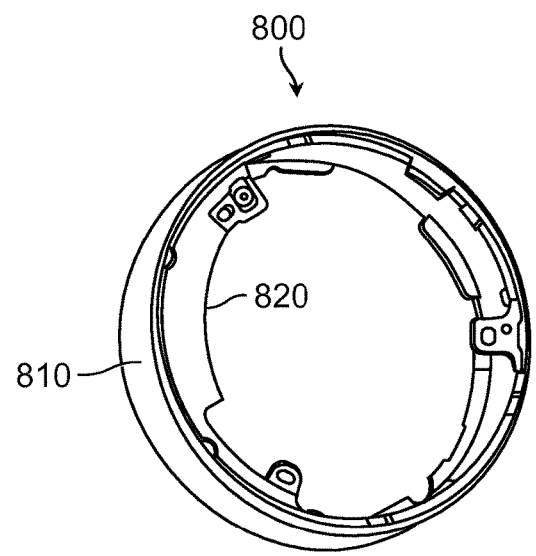
FIG. 6B is a perspective view illustrating the rear frame of the lens barrel in accordance with the first exemplary embodiment.

Configuration of rear frame 800 of lens barrel 1 in accordance with the first exemplary embodiment will be described below. FIG. 6A and FIG. 6B are perspective views illustrating rear frame 800 of lens barrel 1 in accordance with the first exemplary embodiment. FIG. 6A is a perspective view illustrating rear frame 800 when viewed from the subject along the optical axis. FIG. 6B is a perspective view illustrating rear frame 800 when viewed from the imaging device along the optical axis.

As illustrated in FIG. 6A and FIG. 6B, rear frame 800 has rear frame cover 810 and rear frame body 820. Rear frame body 820 is fastened to rear frame cover 810 with an adhesive, for example.

Figure 7A:
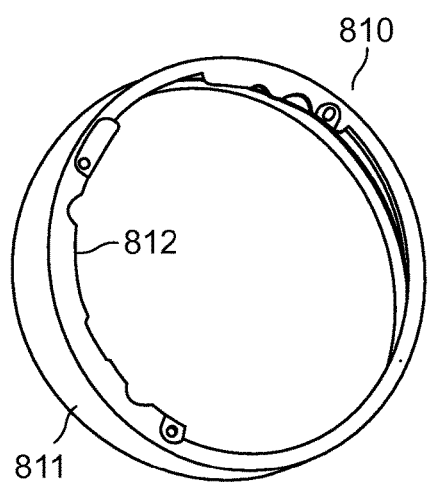
FIG. 7A is a perspective view illustrating a rear frame cover of the lens barrel in accordance with the first exemplary embodiment.
Figure 7B:
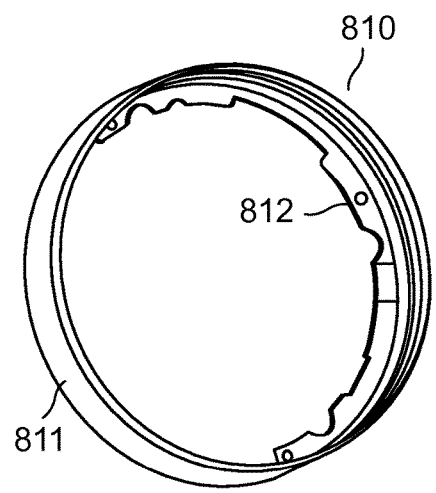
FIG. 7B is a perspective view illustrating the rear frame cover of the lens barrel in accordance with the first exemplary embodiment.

FIG. 7A and FIG. 7B are perspective views illustrating rear frame cover 810 of rear frame 800 of lens barrel 1 in accordance with the first exemplary embodiment. FIG. 7A is a perspective view illustrating rear frame cover 810 when viewed from the subject along the optical axis. FIG. 7B is a perspective view illustrating rear frame cover 810 when viewed from the imaging device along the optical axis.

As illustrated in FIG. 7A and FIG. 7B, rear frame cover 810 has tubular portion 811, and flange 812 provided at a front end of tubular portion 811, that is, an end of tubular portion 811 near the subject along the optical axis. Flange 812 radially extends from tubular portion 811 toward the center of the optical axis. Flange 812 is formed all over the circumference of tubular portion 811. Rear frame cover 810 is made of metal such as aluminum.

Figure 8A:
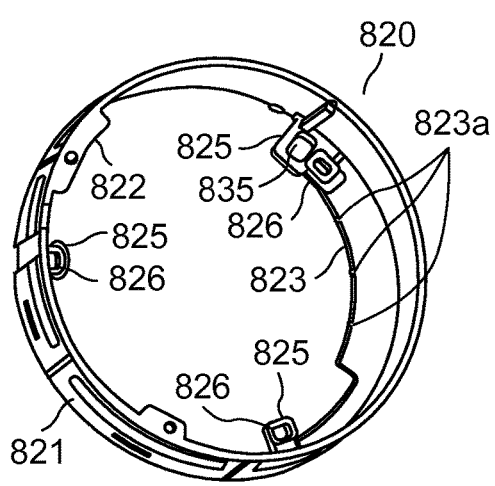
FIG. 8A is a perspective view illustrating a rear frame body of the lens barrel in accordance with the first exemplary embodiment.
Figure 8B:
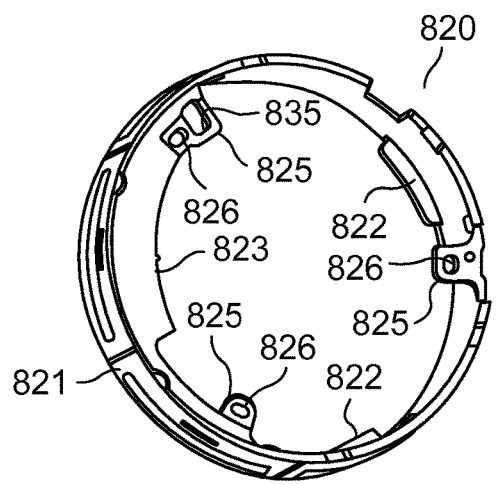
FIG. 8B is a perspective view illustrating a rear frame body of the lens barrel in accordance with the first exemplary embodiment.

FIG. 8A and FIG. 8B are perspective views illustrating rear frame body 820 of lens barrel 1 in accordance with the first exemplary embodiment. FIG. 8A is a perspective view illustrating rear frame body 820 when viewed from the subject along the optical axis. FIG. 8B is a perspective view illustrating rear frame body 820 when viewed from the imaging device along the optical axis.

As illustrated in FIG. 8A and FIG. 8B, rear frame body 820 has tubular portion 821, flanges 822 provided at a front end (end near the subject along the optical axis) of tubular portion 821, and flange 823 provided at a rear end (end near the imaging device along the optical axis) of tubular portion 821. Flanges 822, 823 radially extend from tubular portion 821 toward the center of the optical axis. Flanges 822, 823 are formed on a part of the circumference of tubular portion 821. Rear frame body 820 is made of resin.

Figure 9B:
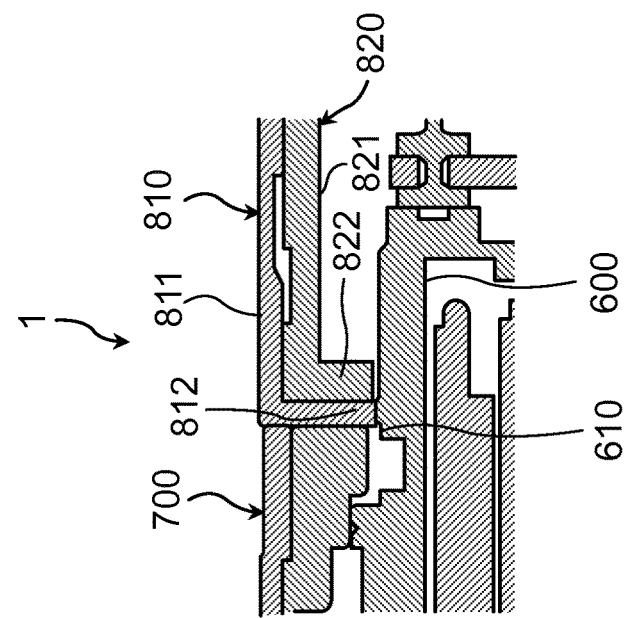
FIG. 9B is a sectional view illustrating a main part of the collapsed lens barrel in accordance with the first exemplary embodiment.
Figure 9A:
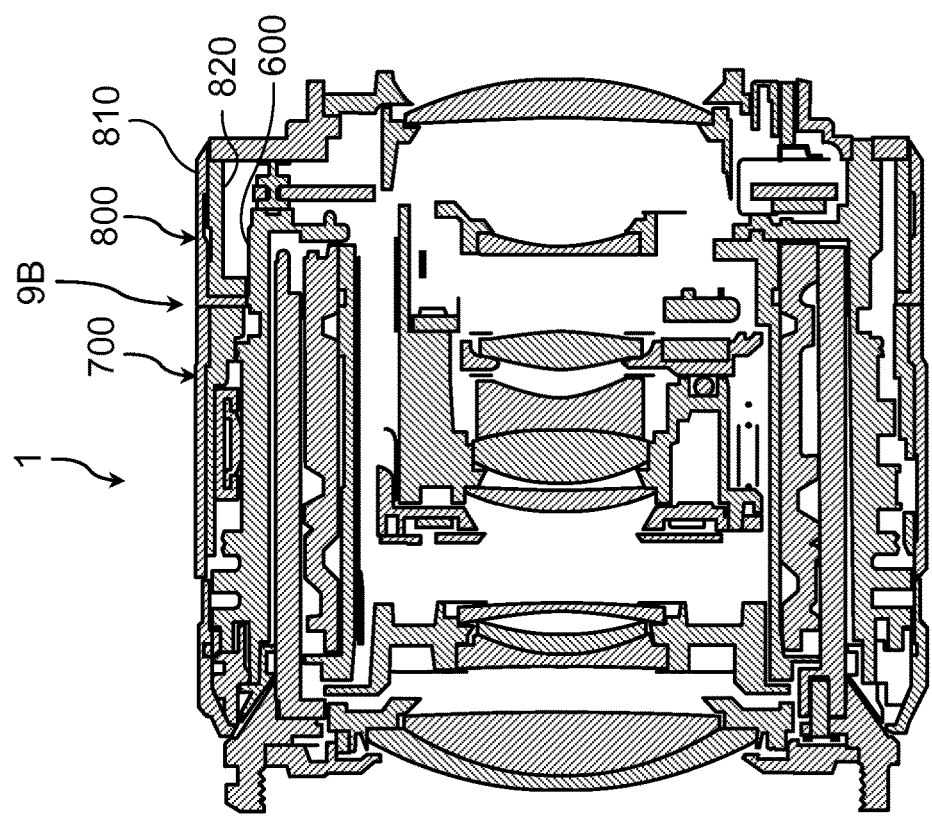
FIG. 9A is a sectional view illustrating the collapsed lens barrel in accordance with the first exemplary embodiment.

FIG. 9A and FIG. 9B are sectional views of lens barrel 1 in accordance with the first exemplary embodiment in the collapsed state. FIG. 9A is a sectional view of whole lens barrel 1. FIG. 9B is an enlarged sectional view illustrating a section expressed by arrow 9B in FIG. 9A.

As illustrated in FIG. 9A and FIG. 9B, since rear frame cover 810 of rear frame 800 has flange 812 all over the circumference of tubular portion 811 at the front end as described above, the cross section of a plane parallel to the optical axis is L-shaped on the front end side. The radial inner end of flange 812 is brought into contact with the outer peripheral face of fixed frame 610 of fixed frame unit 600. The radial inner end of flange 822 of rear frame body 820 is adjacent to the outer peripheral face of fixed frame 610 of fixed frame unit 600.

Conventionally, no flange has been provided at the front end of the rear frame. For this reason, when a radial inward force is applied to the front end of the rear frame, the rear frame may become depressed radially inward. For example, the user may grasp the rear frame to replace a lens, causing deformation of the rear frame. In terms of quality improvement, solving this problem has been requested. In this exemplary embodiment, flange 812 is provided at the front end of rear frame 800, and the radial inner end of flange 812 is brought into contact with the outer peripheral face of fixed frame 610 of fixed frame unit 600, thereby suppressing deformation of rear frame 800.

In this exemplary embodiment, as illustrated in FIG. 10A, FIG. 10B, FIG. 11A, and FIG. 11B, flange 823 at the rear end of rear frame body 820 is also brought into contact with the outer peripheral face of the rear end of fixed frame 610. More specifically, as illustrated in FIG. 8A, a radially inward edge of flange 823 has an arcuate shape corresponding to the tubular outer peripheral face of the rear end of fixed frame 610, and a plurality of small projections 823a that protrude radially inward are formed on a part of the edge of flange 823. Projections 823a are brought into contact with the outer peripheral face of the rear end of fixed frame 610. Therefore, deformation on the rear end of rear frame 800 is also suppressed.

[1-2-2. Attachment of Rear Frame to Fixed Frame Unit]

Figure 10A:
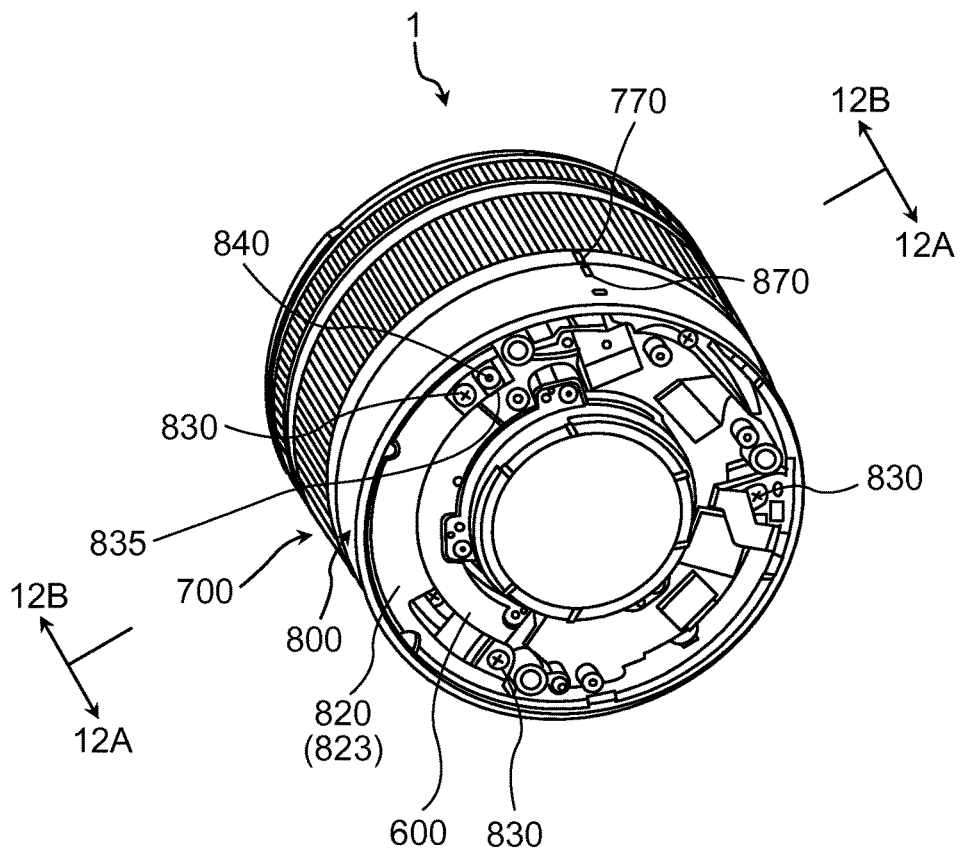
FIG. 10A is a perspective view illustrating a rear end of the lens barrel in accordance with the first exemplary embodiment with a lens mount being removed.
Figure 10B:
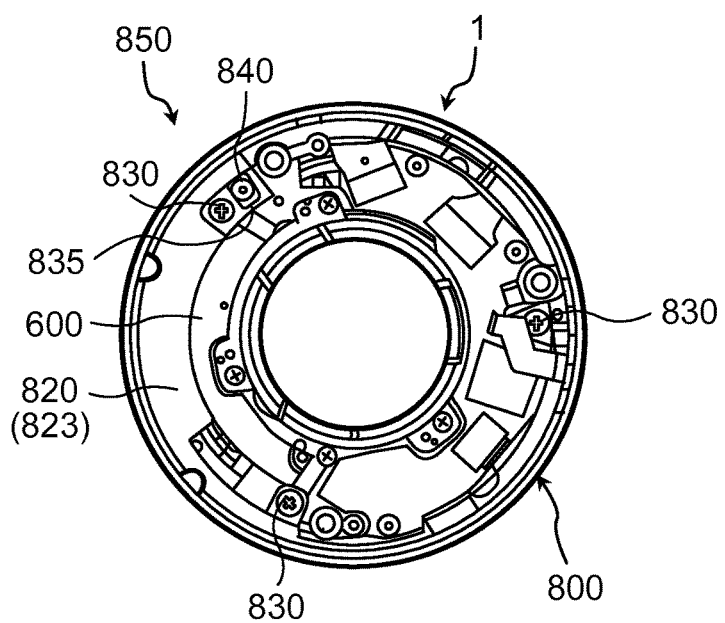
FIG. 10B is a back view illustrating the rear end of the lens barrel in accordance with the first exemplary embodiment with the lens mount being removed.

A structure for attaching rear frame 800 to fixed frame 610 of fixed frame unit 600 will be described below. FIG. 10A and FIG. 10B illustrate outer appearance of lens barrel 1 in accordance with the first exemplary embodiment with lens mount 900 provided at the rear end of lens barrel 1 being removed. FIG. 10A is a perspective view illustrating the rear end of lens barrel 1 with lens mount 900 being removed when viewed from the rear side along the optical axis. FIG. 10B is a back view illustrating the rear end of lens barrel 1 with lens mount 900 being removed when viewed from the rear side along the optical axis.

As illustrated in FIG. 10A and FIG. 10B, rear frame 800 is fixed to the rear end of fixed frame 610 of fixed frame unit 600 with a plurality of fixing screws 830.

Figure 11A:
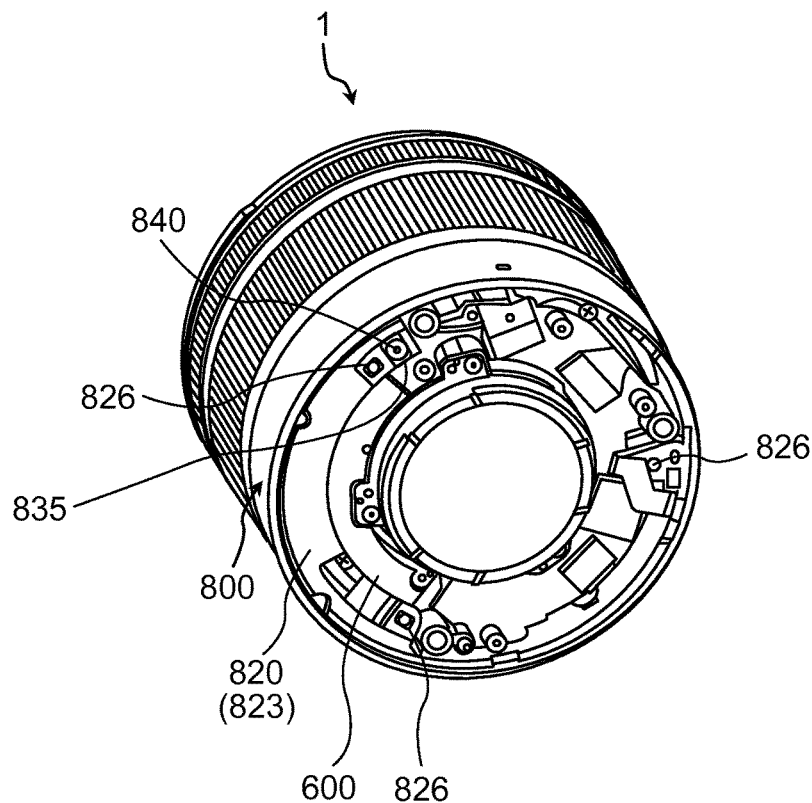
FIG. 11A is a perspective view illustrating the rear end of the lens barrel in accordance with the first exemplary embodiment with the lens mount and a fixing screw for fixing the rear frame being removed.
Figure 11B:
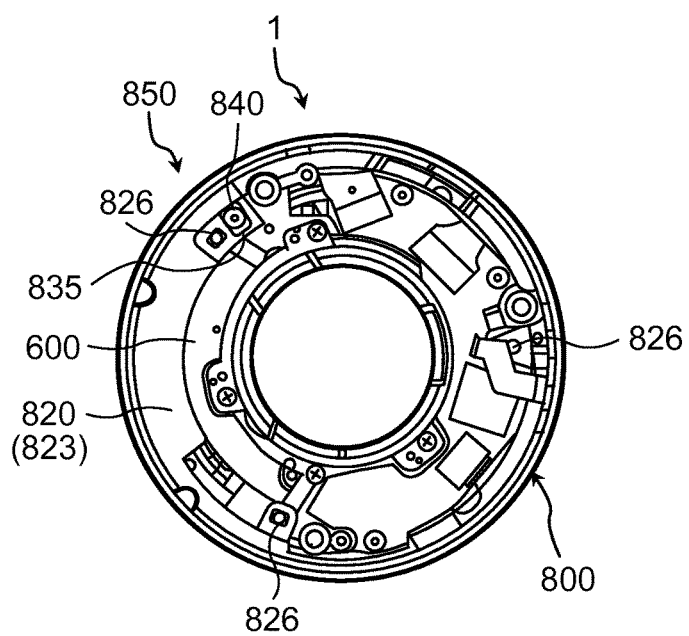
FIG. 11B is a back view illustrating the rear end of the lens barrel in accordance with the first exemplary embodiment with the lens mount and a fixing screw for fixing the rear frame being removed.

FIG. 11A and FIG. 11B are views illustrating the state where fixing screws 830 for fixing rear frame are removed from the state illustrated in FIG. 10A and FIG. 10B, respectively.

As illustrated in FIG. 11A and FIG. 11B, through holes 826 into which fixing screws 830 are inserted in rear frame 800 are circumferentially extending long holes. A circumferential length of each through hole 826 is larger than a diameter of a male screw portion of fixing screw 830, for example, is two or three times as the diameter of the male screw portion. Holes are formed in the rear end of fixed frame 610 at positions corresponding to fixing screws 830. The holes may be provided with female screws engageable with fixing screws 830, or tap tight fixing screws 830 may be screwed to form screws.

As illustrated in FIG. 8, through holes 826 are formed in respective attachment portions 825 that protrude radially inward from the rear end of tubular portion 821 of rear frame body 820 of rear frame 800. Attachment portions 825 are provided at three positions on the circumference of rear frame body 820.

In this exemplary embodiment, adjustment portion 850 that adjusts the position of rear frame 800 in a plane perpendicular to the optical axis in the state where fixation with fixing screws 830 is relaxed. FIG. 12A and FIG. 12B are sectional views illustrating adjustment portion 850 of lens barrel 1 in accordance with the first exemplary embodiment. FIG. 12A is a sectional view taken along a line 12A-12A in FIG. 10A, and FIG. 12B is a sectional view taken along a line 12B-12B in FIG. 10A. As illustrated in FIG. 10A, FIG. 10B, FIG. 11A, FIG. 11B, FIG. 12A, and FIG. 12B, adjustment portion 850 has adjustment pin 840, adjustment-pin insertion hole 835 formed in one of attachment portions 825 of rear frame body 820 of rear frame 800 (see FIG. 8A and FIG. 8B), and an adjustment-pin engagement hole 630 formed in the rear end of fixed frame 610.

Figure 13A:
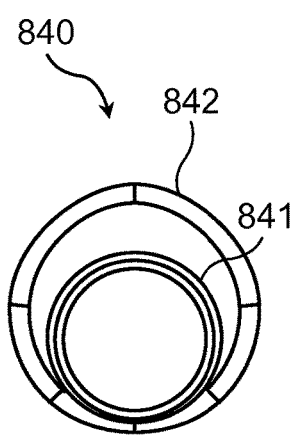
FIG. 13A is a front view illustrating an adjustment pin of the lens barrel in accordance with the first exemplary embodiment.
Figure 13B:
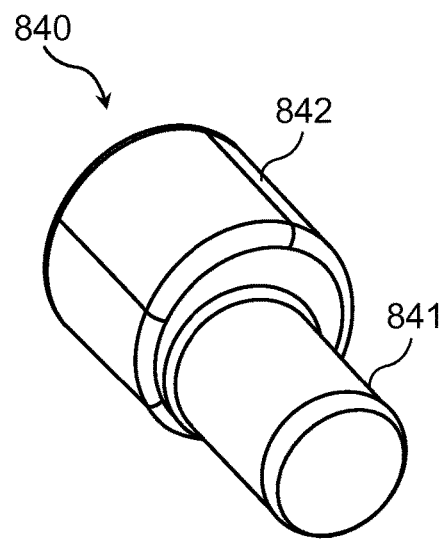
FIG. 13B is a perspective view illustrating the adjustment pin of the lens barrel in accordance with the first exemplary embodiment.

FIG. 13A and FIG. 13B illustrate adjustment pin 840 of lens barrel 1 in accordance with the first exemplary embodiment. FIG. 13A is a front view illustrating adjustment pin 840 when viewed from the front side along the optical axis. FIG. 13B is a perspective view illustrating adjustment pin 840 when viewed from the front side along the optical axis.

Adjustment pin 840 has fixed frame engagement portion 841 and rear frame engagement portion 842.

Fixed frame engagement portion 841 is tubular. Fixed frame engagement portion 841 engages with adjustment-pin engagement hole 630 of fixed frame 610 (see FIG. 12B). Rear frame engagement portion 842 engages with adjustment-pin insertion hole 835 of rear frame body 820 of rear frame 800 (see FIG. 12B).

Rear frame engagement portion 842 is eccentric to the center of tubular fixed frame engagement portion 841, and has a substantially tubular shape having a larger diameter than fixed frame engagement portion 841. More specifically, when viewed along the optical axis, rear frame engagement portion 842 is substantially heart-shaped. Due to this shape, when the adjustment pin is rotated by a certain angle, adjustment-pin insertion hole 835 of rear frame 800 can be circumferentially moved at predetermined speed.

FIG. 14 is a schematic enlarged view illustrating the place where adjustment pin 840 engages with fixed frame 610 and rear frame 800 of lens barrel 1 in accordance with the first exemplary embodiment.

As illustrated in FIG. 12A, FIG. 12B, and FIG. 14, adjustment-pin engagement hole 630 of fixed frame 610 is a circular hole having almost the same diameter as the diameter of tubular fixed frame engagement portion 841 of adjustment pin 840. More specifically, the diameter of adjustment-pin engagement hole 630 is slightly larger than that of adjustment pin 840 such that adjustment pin 840 can rotate in adjustment-pin engagement hole 630.

As illustrated in FIG. 8A, FIG. 8B, FIG. 12A, FIG. 12B, and FIG. 14, adjustment-pin insertion hole 835 of rear frame 800 is substantially shaped like a radially-extending rectangle. A circumferential length of adjustment-pin insertion hole 835 is almost the same as a longitudinal diametral length of rear frame engagement portion 842 of adjustment pin 840. More specifically, the circumferential length of adjustment-pin insertion hole 835 is slightly larger than the diameter of adjustment pin 840 such that adjustment pin 840 can rotate in adjustment-pin insertion hole 835.

With such configuration, in the state where fixation of rear frame 800 to fixed frame 610 with fixing screws 830 is relaxed, adjustment pin 840 is rotated. Then, since rear frame engagement portion 842 of adjustment pin 840 is eccentric, and the circumferential length of adjustment-pin insertion hole 835 is almost the same as the longitudinal diametral length of rear frame engagement portion 842 of adjustment pin 840, adjustment-pin insertion hole 835 circumferentially moves, that is, rear frame 800 circumferentially moves. Thus, rotating adjustment pin 840 enables adjustment of the circumferential position of rear frame 800 in the plane perpendicular to the optical axis. After the adjustment, the adjusted position can be kept by fixing rear frame 800 to fixed frame 610 with fixing screws 830.

Because rear frame 800 has been conventionally fixed to fixed frame 610 with only a fixing screw, it has been difficult to adjust the position of rear frame 800 relative to fixed frame 610 in the plane perpendicular to the optical axis. Thus, it has been difficult to adjust displacement between an indicator on zoom frame 700 and an indicator on rear frame 800. An improvement of this situation has been demanded in terms of the beauty and marketability. However, with the structure of attachment of rear frame 800 to fixed frame 610 in this exemplary embodiment, circumferential positional relationship between indicator 770 of zoom frame 700 and indicator 870 on rear frame 800 can be adjusted using adjustment portion 850 more readily and accurately. This enhances the beauty and marketability.

In this exemplary embodiment, the camera barrel includes adjustment pin 840. However, adjustment pin 840 is not necessarily provided in the camera barrel. That is, adjustment pin 840 is not essential in adjustment portion 850. For example, adjustment can be made by using a driver (adjustment tool) having a front end of the same shape as adjustment pin 840. In other words, at adjustment, fixed frame engagement portion 841 and rear frame engagement portion 842 on the adjustment tool are inserted into adjustment-pin engagement hole 630 of fixed frame 610 and adjustment-pin insertion hole 835 of rear frame 800, and they are rotated in this state, achieving the same action and effect as described above.

[1-3. Positional Relationship of Zoom Frame, Cam Frame, and Circuit Board]

Positional relationship of zoom frame 700, cam frame 500, and circuit board 950 will be described below. FIG.

Figure 15A:
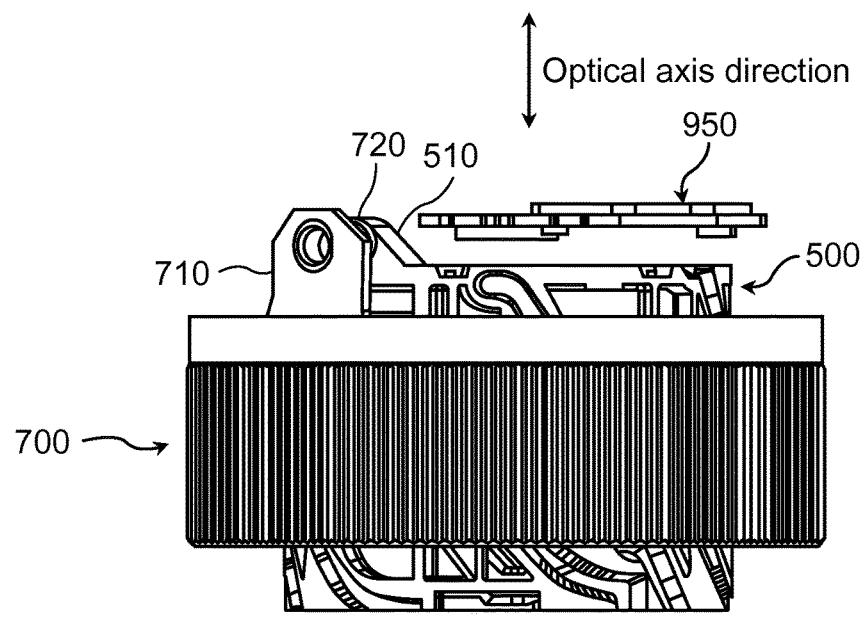
FIG. 15A is a side view illustrating positional relationship of a zoom frame, a cam frame, a coupling pin, and a board in accordance with the first exemplary embodiment.
Figure 15B:
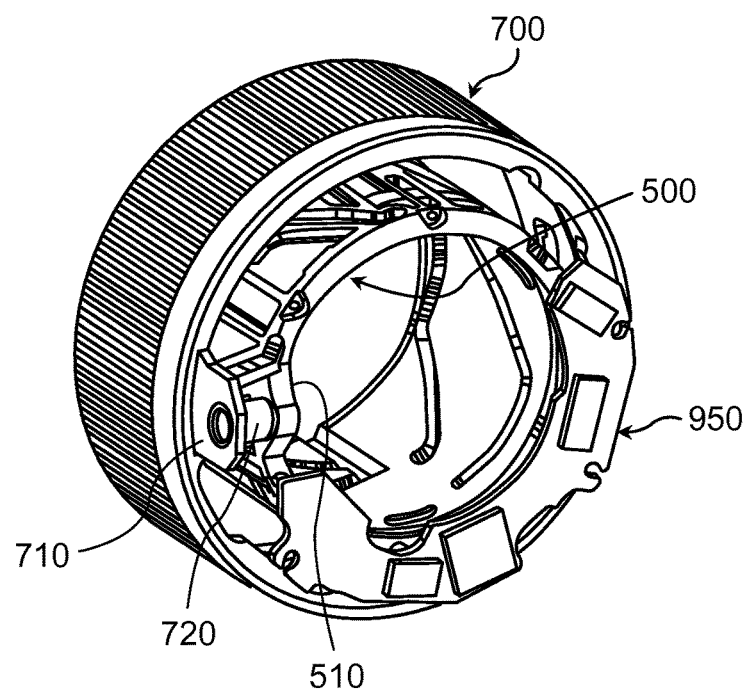
FIG. 15B is a perspective view illustrating positional relationship of the zoom frame, the cam frame, the coupling pin, and the board in accordance with the first exemplary embodiment.
Figure 16A:
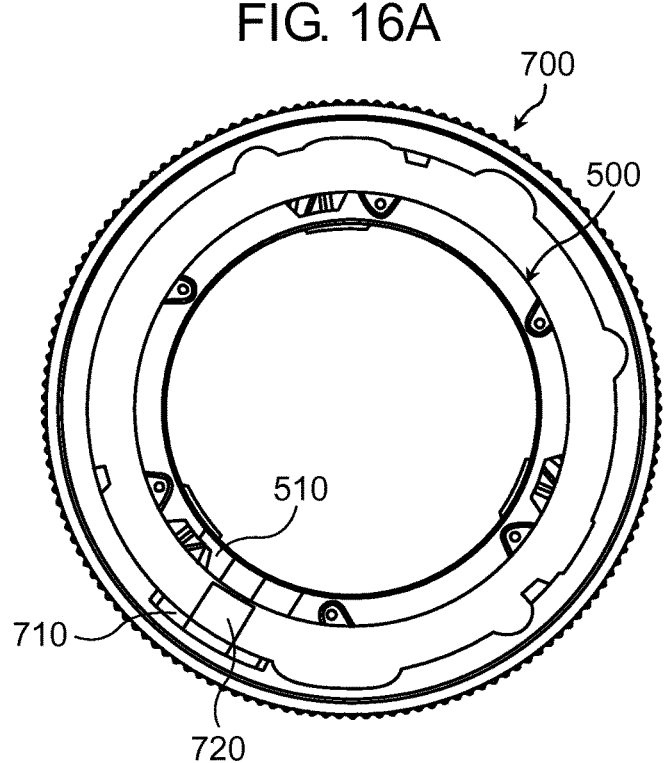
FIG. 16A is a back view illustrating positional relationship of the zoom frame and the cam frame in accordance with the first exemplary embodiment.
Figure 16B:
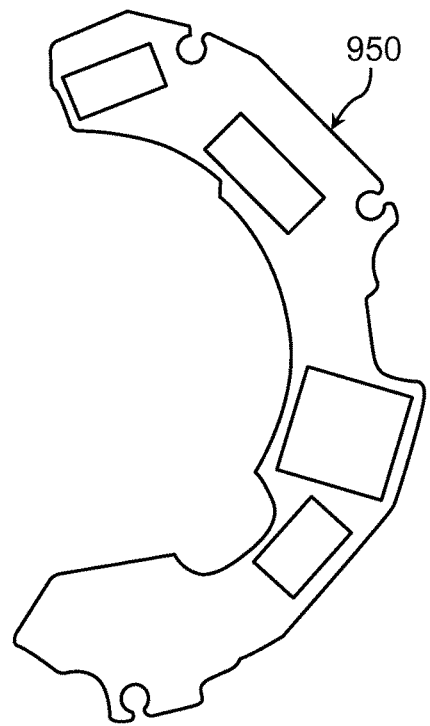
FIG. 16B is a view illustrating outer appearance of only a circuit board in accordance with the first exemplary embodiment.

15A and FIG. 15B are views illustrating the positional relationship of zoom frame 700, cam frame 500, coupling pin 720, and circuit board 950 in accordance with the first exemplary embodiment. FIG. 15A is a side view illustrating zoom frame 700, cam frame 500, and circuit board 950 in the state where the positional relationship after assembling is kept, when viewed along the optical axis. FIG. 15B is a perspective view illustrating zoom frame 700, cam frame 500, and circuit board 950 in the state where the positional relationship after assembling is kept, when viewed from the diagonal rear (imaging device) along the optical axis. FIG. 16A and FIG. 16B are a view illustrating positional relationship of zoom frame 700 and cam frame 500 in accordance with the first exemplary embodiment, and a view illustrating outer appearance of only circuit board 950, respectively. FIG. 16A is a back view illustrating zoom frame 700 and cam frame 500 in the state where positional relationship after assembling is kept, when viewed from the imaging device along the optical axis. FIG. 16B is a back view illustrating circuit board 950 when viewed from the imaging device along the optical axis.

As illustrated in FIG. 15A, FIG. 15B, and FIG. 16A, protruding piece 710 that protrudes backward is provided at the rear end of zoom frame 700. Protruding piece 510 that protrudes backward is provided at the rear end of cam frame 500. Coupling pin 720 that couples protruding piece 710 (support portion) of zoom frame 700 to protruding piece 510 of cam frame 500 is also provided. Accordingly, zoom frame 700 and cam frame 500 are coupled to each other so as to be unrotatable relative to each other and be unmovable along the optical axis. Thus, when zoom frame 700 rotates, the rotation is transmitted to cam frame 500 through coupling pin 720, and cam frame 500 rotates with the rotation of zoom frame 700.

Circuit board 950 is a board on which electronic components for controlling operation of lens barrel 1, and so on are disposed.

In this exemplary embodiment, as illustrated in FIG. 15A, coupling pin 720, protruding piece 710 of zoom frame 700, and protruding piece 510 of cam frame 500 are disposed on the substantially same plane as the plane where circuit board 950 is disposed along the optical axis.

Circuit board 950 is arranged so as not to overlap a circumferential rotational scope of coupling pin 720, or a circumferential rotational scope of protruding piece 710 and protruding piece 510, which support coupling pin 720 in zoom frame 700 and cam frame 500. Specifically, as illustrated in FIG. 16B, circuit board 950 has an approximately C-shape formed by partially cutting an annular ring.

Figure 17A:
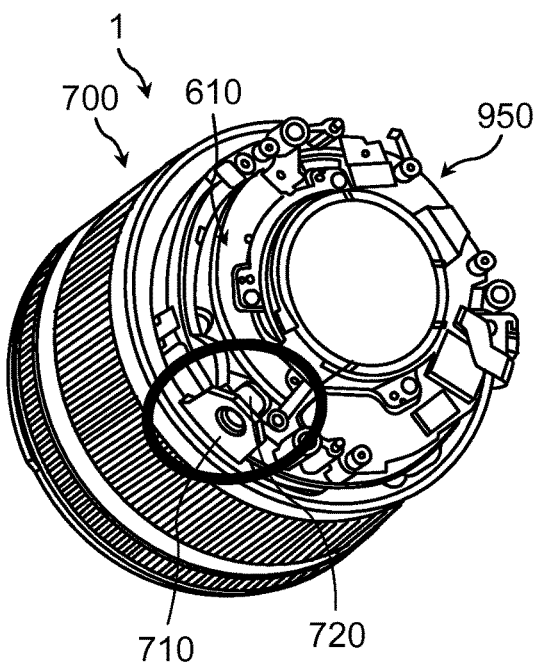
FIG. 17A is a perspective view illustrating positional relationship of the zoom frame, the cam frame, the coupling pin, and the board in a collapsed state in accordance with the first exemplary embodiment.
Figure 17B:
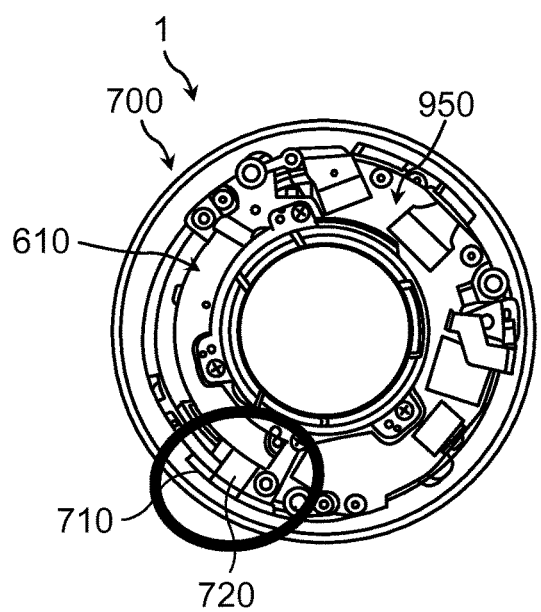
FIG. 17B is a back view illustrating positional relationship of the zoom frame, the cam frame, the coupling pin, and the board in the collapsed state in accordance with the first exemplary embodiment.
Figure 18A:
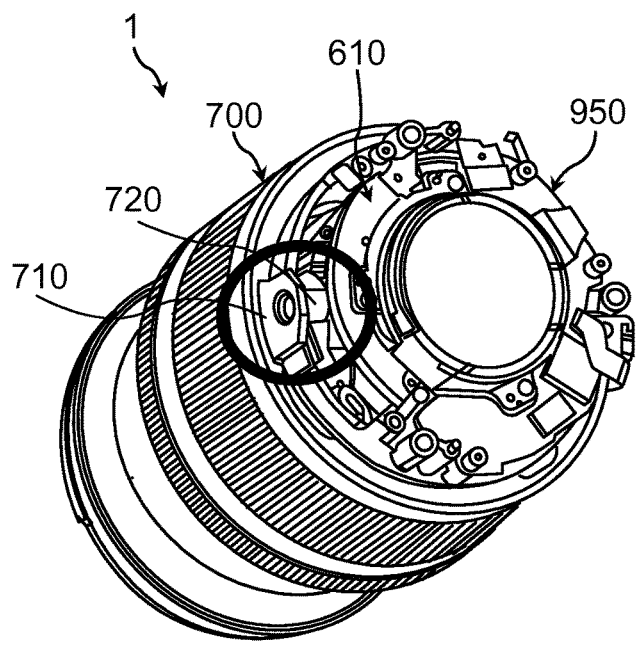
FIG. 18A is a perspective view illustrating positional relationship of the zoom frame, the cam frame, the coupling pin, and the board in a wide state in accordance with the first exemplary embodiment.
Figure 18B:
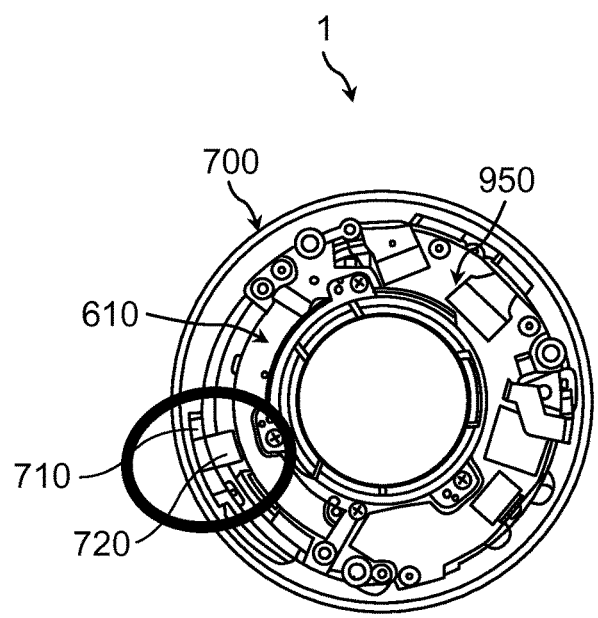
FIG. 18B is a back view illustrating positional relationship of the zoom frame, the cam frame, the coupling pin, and the board in the wide state in accordance with the first exemplary embodiment.
Figure 19A:
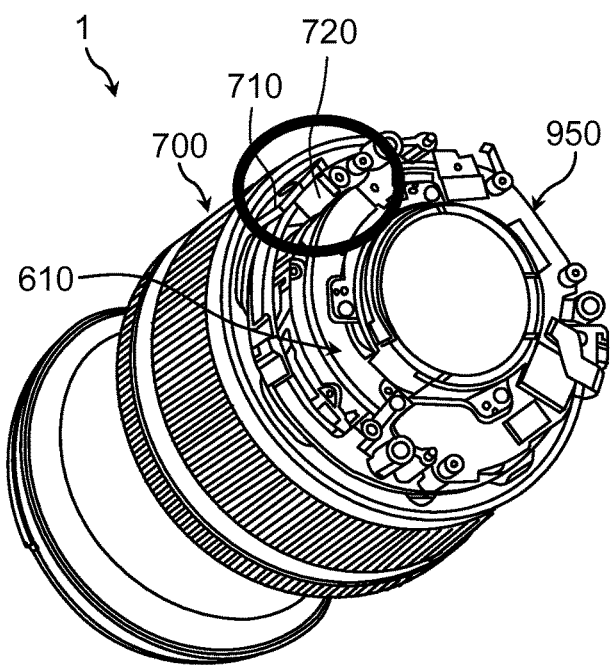
FIG. 19A is a perspective view illustrating positional relationship of the zoom frame, the cam frame, the coupling pin, and the board in a telephoto state in accordance with the first exemplary embodiment.
Figure 19B:
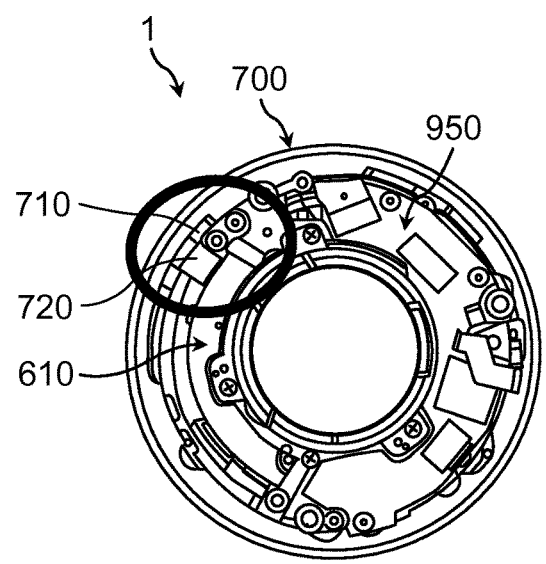
FIG. 19B is a back view illustrating positional relationship of the zoom frame, the cam frame, the coupling pin, and the board in the telephoto state in accordance with the first exemplary embodiment.

As illustrated in FIG. 17A, FIG. 17B, FIG. 18A, FIG. 18B, FIG. 19A, and FIG. 19B, circuit board 950 is fixed to rear end of fixed frame 610. FIG. 17A and FIG. 17B are views illustrating positional relationship of zoom frame 700, cam frame 500, coupling pin 720, and circuit board 950 in the collapsed state in accordance with the first exemplary embodiment. FIG. 18A and FIG. 18B are views illustrating positional relationship of zoom frame 700, cam frame 500, coupling pin 720, and circuit board 950 in the wide state (wide angle) in accordance with the first exemplary embodiment. FIG. 19A and FIG. 19B are views illustrating positional relationship of zoom frame 700, cam frame 500, coupling pin 720, and circuit board 950 in the telephoto state (telephotographic) in accordance with the first exemplary embodiment. FIG. 17A, FIG. 18A, and FIG. 19A are perspective views illustrating lens barrel 1 with lens mount 900 and rear frame 800 being removed when viewed from the diagonal rear side (imaging device) along the optical axis. FIG. 17B, FIG. 18B, and FIG. 19B are back views illustrating lens barrel 1 with lens mount 900 and rear frame 800 being removed when viewed from the imaging device along the optical axis.

As illustrated in FIG. 17A, FIG. 17B, FIG. 18A, FIG. 18B, FIG. 19A, and FIG. 19B, in the collapsed state, the wide state, and the telephoto state, positional relationship of protruding piece 710 of zoom frame 700, protruding piece 510 of cam frame 500, coupling pin 720, and circuit board 950 circumferentially changes according to the zoom state. However, in any state, protruding piece 710 of zoom frame 700, protruding piece 510 of cam frame 500, and coupling pin 720 are not brought into contact with circuit board 950. Further, positional relationship of protruding piece 710 of zoom frame 700, protruding piece 510 of cam frame 500, coupling pin 720, and circuit board 950 along the optical axis does not change.

Conventionally, the circuit board is ring-shaped, for example. Thus, to prevent contact against the circuit board, protruding piece 710 of zoom frame, protruding piece 510 of cam frame, and coupling pin 720 are disposed closer to the subject than the circuit board along the optical axis. As a result, the cam frame and the zoom frame, as well as components of the cam frame and the zoom frame near the subject are arranged on the side of the subject, relative to the rear end of fixed frame 610, to which the circuit board is attached. In this exemplary embodiment, it is no need to arrange each component on the side of the subject, relative to the rear end of fixed frame 610, to which the circuit board is attached. Moreover, protruding piece 710 of zoom frame 700, protruding piece 510 of cam frame 500, coupling pin 720, and circuit board 950 are disposed in the substantially same plane along the optical axis, enabling reduction of the length of lens barrel 1 along the optical axis. That is, lens barrel 1 can be made compact.

[2. Effects]

Lens barrel 1 in this exemplary embodiment is lens barrel 1 attachable to a camera body, and includes:

lens mount 900 (mount) mechanically or electrically connected to the camera body;

fixed frame 610 fixed to lens mount 900; and rear frame 800 that covers an outer periphery of fixed frame 610.

Rear frame 800 has tubular portions 811, 821, and flanges 812, 822 and 823 extending radially inward from at least one of a front end near a subject along the optical axis and a rear end near an imaging device along the optical axis in tubular portions 811, 821, and at least parts of radial inner ends of flanges 812, 822 and 823 are brought into contact with fixed frame 610.

In lens barrel 1 in this exemplary embodiment, rear frame 800 has flanges 812, 822 and 823 extending radially inward from at least one of the front end and the rear end of tubular portion 811. For this reason, radial strength of rear frame 800 increases. Further, at least parts of the radial inner ends of flanges 812, 822 and 823 are brought into contact with fixed frame 610. Therefore, even when a radially inward force is applied to rear frame 800, deformation of rear frame 800 is suppressed.

Lens barrel 1 in this exemplary embodiment further includes:

fixing screws 830 (fixing member) that fixed rear frame 800 to fixed frame 610; and adjustment portion 850 that adjust position of rear frame 800 in a plane perpendicular to the optical axis in a state where fixation with fixing screws 830 is relaxed.

This can adjust positional relationship of rear frame 800 and fixed frame 610 in the plane perpendicular to the optical axis.

(Note)

This exemplary embodiment also discloses configuration of a following lens barrel.

Lens barrel 1 in this exemplary embodiment
is lens barrel 1 attachable to a camera body, and includes:

lens mount 900 (mount) mechanically or electrically connected to the camera body;

fixed frame 610 fixed to lens mount 900;

circuit board 950 coupled to a rear end of fixed frame 610 along the optical axis;

cam frame 500 disposed on the radial inner side of fixed frame 610 and supported on fixed frame 610 so as to be rotatable relative to fixed frame 610 and be unmovable along the optical axis;

zoom frame 700 disposed on the outer periphery of fixed frame 610; and coupling pin 720 that couples zoom frame 700 to cam frame 500 at rear ends of zoom frame 700 and cam frame 500 such that zoom frame 700 and cam frame 500 are unrotatable relative to each other and unmovable along the optical axis.

Circuit board 950 is formed so as not to overlap the circumferential rotational scope of coupling pin 720, or the circumferential rotational scope of protruding piece 710 and protruding piece 510 (part) that support coupling pin 720 in zoom frame 700 and cam frame 500.

Coupling pin 720, or protruding piece 710 and protruding piece 510 that support coupling pin 720 in zoom frame 700 and cam frame 500 is arranged in substantially the same plane (position) as the plane (position) where circuit board 950 is arranged along the optical axis.

Since protruding piece 710 of zoom frame 700, protruding piece 510 of cam frame 500, coupling pin 720, and circuit board 950 are thereby arranged at the same position along the optical axis as described above, the length of lens barrel 1 along the optical axis can be reduced. That is, lens barrel 1 can be made compact.

Other Exemplary Embodiments

The first exemplary embodiment has been described above as an example of the technique disclosed in this application. However, the technique of the present disclosure is not limited to the embodiment, and may be applied to exemplary embodiments subjected to modification, replacement, addition, and omission as appropriate. The components described in first exemplary embodiment may be combined to create a new exemplary embodiment.

In the first exemplary embodiment, rear frame 800 includes rear frame cover 810 and rear frame body 820. However, rear frame 800 may include one member, or three or more members.

In the first exemplary embodiment, both of flange 812 and flange 823 of rear frame 800 are brought into contact with fixed frame 610. However, according to the present disclosure, only flange 812 of rear frame cover 810 may be brought into contact with fixed frame 610, or only flange 823 of rear frame body 820 may be brought into contact with fixed frame 610.

In the first exemplary embodiment, fixed frame 610 is provided with adjustment-pin engagement hole 630, and rear frame 800 is provided with adjustment-pin insertion hole 835. However, fixed frame 610 may be provided with an adjustment-pin insertion hole, and rear frame 800 may be provided with adjustment-pin engagement hole 630 to attach the adjustment pin along the optical axis in the opposite manner to the first exemplary embodiment.

In the first exemplary embodiment, fixing screws 830 are used as the fixing member. However, the fixing member is not limited to screw, and may be any member capable of releasing the fixing state. For example, a pin capable of releasing the fixing state may be adopted.

In the first exemplary embodiment, the lens barrel is the interchangeable lens barrel attached to a single-lens camera. However, the technique in this exemplary embodiment can be applied to an uninterchangeable lens barrel integrally attached to the camera body. In this case, the fixed frame is fixed to a housing of the camera body, rather than the lens mount. The rear frame covers the outer periphery of the fixed frame between the zoom frame and the camera body. With such configuration, the rear frame has a tubular portion, and a flange extending radially inward from at least one of a front end and a rear end of the tubular portion, and at least a part of a radial inner end of the flange is brought into contact with the fixed frame. Alternatively, a coupling pin, or a part that supports the coupling pin in the zoom frame and the cam frame is disposed at the same position as the position where the board is placed along the optical axis.

The exemplary embodiment has been described above as a technical example of the present disclosure. To this end, appended figures and detailed description are provided.

Therefore, the constituents in the appended figures and detailed description may include constituents that are essential to solve the problem as well as constituents that are unessential to solve the problem and serve to merely illustrate the above-mentioned technique. Thus, that the unessential constituents are shown and described in the appended figures and detailed description does not mean that the unessential constituents are required.

The exemplary embodiment illustrates the technique according to the present disclosure, and any change, replacement, addition, and omission may be made to the exemplary embodiment in any manner within the scope of claims and their equivalents.

INDUSTRIAL APPLICABILITY

The lens barrel of the present disclosure may be widely applied to lens any barrel that accommodates a lens.

What is claimed is:

1. A lens barrel attachable to a camera body, the lens barrel comprising:
    a mount mechanically or electrically connected to the camera body;
    a fixed frame fixed to the mount; and
    a rear frame that covers an outer periphery of the fixed frame, wherein
    the rear frame has a tubular portion, and a flange that extends radially inward from at least one of a front end near a subject along an optical axis and a rear end near an imaging device along the optical axis of the tubular portion, and
    at least a part of a radial inner end of the flange is brought into contact with the fixed frame.

2. The lens barrel according to claim 1, further comprising:
    a fixing member that fixes the rear frame to the fixed frame; and an adjustment portion that adjusts a position of the rear frame in a plane perpendicular to the optical axis with the fixation by the fixing member being relaxed.

3. The lens barrel according to claim 1, wherein the rear frame has the flange only at the front end of the tubular portion.

\* \* \* \* \*